(12) United States Patent
Cheng (10) Patent No.: US 7,190,353 B2
(45) Date of Patent: Mar. 13, 2007

(54) METHOD TO IMPLEMENT AN ADAPTIVE-AREA PARTIAL INK LAYER FOR A PEN-BASED COMPUTING DEVICE

(75) Inventor: Brett Anthony Cheng, Vancouver (CA)

(73) Assignee: Seiko Epson Corporation, Tokyo (JP)

( * ) Notice: Subject to any disclaimer, the term of this patent is extended or adjusted under 35 U.S.C. 154(b) by 813 days.

(21) Appl. No.: 10/420,084

(22) Filed: Apr. 22, 2003

(65) Prior Publication Data
US 2004/0212584 A1   Oct. 28, 2004

(51) Int. Cl.
*G09G 5/00* (2006.01)
(52) U.S. Cl. ...................... 345/173; 345/156
(58) Field of Classification Search ........ 345/173–179, 345/156; 178/18.01–19.01
See application file for complete search history.

(56) References Cited

U.S. PATENT DOCUMENTS

| | | | |
|---|---|---|---|
| 5,521,986 A | 5/1996 | Curtin, II et al. | |
| 6,160,555 A | 12/2000 | Kang et al. | |
| 6,335,725 B1 | 1/2002 | Koh et al. | |
| 6,788,294 B2 * | 9/2004 | Takala et al. | 345/173 |
| 6,842,170 B1 * | 1/2005 | Akins et al. | 345/173 |
| 2003/0197688 A1 * | 10/2003 | Aufderheide et al. | 345/173 |

* cited by examiner

*Primary Examiner*—Ricardo Osorio
(74) *Attorney, Agent, or Firm*—Mark P. Watson (57) ABSTRACT

A method of producing an adaptive partial ink layer for a pen based computing device is described. The adaptive partial ink layer is used to form an ink trail, which follows the input pen as it moves in contact with a touch screen. This allows the user to view the input while it is being made, which allows the input to be improved through the visual observation. A three-cell block is formed to permit single character input from the pen and then the block is extended in the direction of a cursive input to accommodate a word or phrase. Whereas, a common direction for the cursive input is from left to right, any direction emanating from the three cell block can be used if the interpreter of the pen passed computing device is set up to allow such an input.

58 Claims, 7 Drawing Sheets

METHOD TO IMPLEMENT AN ADAPTIVE-AREA PARTIAL INK LAYER FOR A PEN-BASED COMPUTING DEVICE

BACKGROUND OF THE INVENTION

1. Field of Invention

The present invention relates a pen-based computing device and in particular to the use of a partial ink layer.

2. Description of Related Art

A pen-based device, such as a PDA (personal data assistant) or a tablet-based computer, uses an LCD display overlaid by a transparent touch screen. Other devices, such as smart phones or other intelligent devices, are becoming available and may use small displays and pen-based input. The touch screen is used to input the location of a pen, or stylus, when the pen touches the surface of the touch screen. When the pen comes in contact with the touch screen, the CPU contained within the PDA interprets the X and Y coordinates of the location of the pen and performs operations depending on where the pen is located. A PDA like device uses several methods of data input, clicking on "soft" buttons or icons on the display screen, handwriting recognition, and text input using the pen on the touch screen. Handwriting can be character based by entering one character at a time or fully cursive where full words or phrases are entered at one time.

In U.S. Pat. No. 6,335,725 B1 (Koh et al.) a method is directed to partitioning a touch screen data input device into a main portion and a secondary portion. The first portion is accessible to a user using a stylus or pen and the second portion is accessible by a finger of the user holding the device. U.S. Pat. No. 6,160,555 (Kang et al.) is directed to a method to provide a cue for a user of a hand held device when entering or editing characters. U.S. Pat. No. 5,521,986 (Curtin II et al,) is directed to using a mosaic display as a template for imputing characters. The displayed mosaic has a plurality of segments, each represented by a tile area of the template.

In a pen based character input to a computing device, input is generally constrained to a area surrounding or near the initial pen-down point on the touch screen overlaying the display of the computing device. Input is generally by character, such as pen-down+pen stroke+pen-up. This is the case for Graffiti™ used on Palm OS devices with the exception of the multi-stroke characters. There are other forms of input that do not follow the simple character input steps like fully cursive input and Kanji characters, and in these multi-stoke cases it can also be found that once the initial pen point is known, the required entry will be located near or around the initial point of contact of the touch screen by the pen. The pen point alone does not provide enough information about the dimensions and orientation of the user entry; however, by monitoring the direction after the initial point of contact, it is possible to predict the confining area of entry by the user. Whereas, pen strokes of individual characters may traverse any direction while creating a character, the basic direction of character and word entry is unidirectional, such as left to right.

SUMMARY OF THE INVENTION

It is an objective of the present invention to provide a method to implement an adaptive partial ink layer area on a display of computing device where the adaptive partial ink layer follows the movement of a touching device and provides an ink trail of the touching device.

It is another objective of the present invention to provide an adaptive partial ink layer area for input of a single character by a touching device in contact with a touch screen.

It is yet another objective of the present invention to provide an adaptive partial ink layer area for input of a full cursive word or phrase by a touching device in contact with a touch screen.

It is still another objective of the present invention to provide a first cell of an adaptive ink layer area centered at the point of contact of a touching device with the touch screen, a second cell and cells subsequent to the second cell that are continuously adjacent to a cell boundary crossed by the touching device while forming a character, word or phrase.

It is further an objective of the present invention to provide a first and second cell that are square in shape with the length of each side being P pixels in length, and a third and subsequent cells that are rectangular in shape with sides that are P pixels by 2P pixels in length.

It is still further an objective of the present invention to use a square first cell, a square second cell and a rectangular third cell to form an adaptive continuous ink layer block of 2P pixels by 2P pixels for character input on a display of a computing device, wherein each cell is formed as a touching device in contact with a touch screen crosses a boundary of the previously formed cell.

It is yet further an objective of the present invention to use a square first cell, a square second cell and N rectangular third cells to form a continuous adaptive ink layer that is 2P pixels wide and P+NP pixels long for a full cursive word or phrase input, wherein each cell is formed as a touching device in contact with a touch screen crosses a boundary of a previously formed cell.

It is also an objective of the present invention to provide the partial ink layer to reduce memory requirements for storage of ink layer pixels in comparison to a traditional ink layer covering a full display.

In the present invention an adaptive partial ink layer is formed to display an ink trail of a touching device in contact with a touch screen of a computing device is used to create characters as input. It should be noted that the touching device can be a pen, a stylus, a finger or any other object sufficient to input character shapes onto a touch screen. A first cell of the adaptive partial ink layer is formed and centered at the point of contact of the touching device with the touch screen. As the touching device crosses a boundary of the first cell, a second cell is formed continuously adjacent to the first cell along the crossed boundary of the first cell. As the touching device crosses a boundary of the second cell which is not the crossed boundary of the first cell, a third cell is formed that is continuously adjacent to the second cell along the crossed boundary of the second cell and continuously adjacent to an exposed boundary of the first cell.

To visualize the creation of the adaptive partial ink layer, one should think of a square shaped first and second cell dimensioned to be P×P and a rectangular third cell dimensioned to be 2P×P, for example, where P is the number of display screen pixels along the edge of a cell. Whereas, the example presented herein is a practical example, any other combination of shapes that can be created to form an adaptive ink layer can be used. The pen touching device contacting the touch screen causes the first cell to be formed with a center located at the point of contact of the touching device and the touch screen. As the touching device is moved within the first cell an ink trail is formed, and as the touching device crosses a boundary of the first cell, the second cell is formed that is continuously adjacent with the first cell which allows the ink trail to also be continuous.

The first cell can be located above the second cell as a result of the touching device moving across the lower boundary of the first cell, or the first cell can be located below the second cell as a result of the touching device moving up across the upper boundary of the first cell. In either case the third cell is formed when the touching device crosses a vertical boundary of the second cell, either the left or right vertical boundary. The third cell is formed along the left boundaries of the first and second cells if the touching device crosses the left vertical boundary of the first or second cell forming a square adaptive partial ink layer block having the dimensions of 2P×2P. The third cell is formed along the right boundaries of the first and second cells if the touching device crosses the right vertical boundary of the first or second cell forming a square adaptive partial ink layer block having the dimensions of 2P×2P. As the touching device crosses the boundary between the first or second cell and the third cell an ink trail is continuously formed following the movement of the touching device, and will follow the touching device even if the touching device returns to either the first or second cell.

The first cell can be located to the left of the second cell as a result of the touching device moving across the right vertical boundary of the first cell, or the first cell can be located to the right of the second cell as a result of the touching device across the left boundary of the first cell. In either case the third cell is formed when the touching device crosses an upper or lower boundary of the first or second cell. The third cell is formed along the upper boundaries of the first and second cells if the touching device crosses the upper boundary of the first or second cell forming a square adaptive partial ink layer block having the dimensions of 2P×2P. The third cell is formed along the lower boundaries of the first and second cells if the touching device crosses the lower boundary of the first or second cell forming a square adaptive partial ink layer block having the dimensions of 2P×2P. As the pen crosses the boundary between the first or second cell and the third cell an ink trail is continuously formed following the movement of the touching device, and will follow the pen even if the pen returns to either the first or second cell.

A square adaptive partial ink layer block comprising three cells is adequate for simple character entry. In some cases a block comprising fewer than three cell is adequate for simple character entry; however, when a fully cursive entry containing a plurality of characters such as a word is required, additional adaptive ink layer space is required. In the example noted above this additional adaptive ink layer space is obtained by adding additional rectangular cells having the dimensions of 2P×P pixels to the original block. The additional rectangular cells are added to the initial three-cell 2p×2p adaptive partial ink layer at the side crossed by the pen and in the direction of flow of cursive entry. This forms a rectangular adaptive partial ink layer with dimensions of 2P×(2+N)P, where N is the number of additional rectangular cells formed to display an ink trail for the cursive input. Each additional rectangular cell N is formed when the touching device crosses a boundary of the N−1 cell, which is opposite the boundary with the N−2 cell. The ink trail is continuous, following the touching device from cell to cell, and remains to be viewed by the user until the touching device has been lifted from contact with the touch screen that overlays the display screen of the computing device for a predetermined time T. Whereas, the adaptive growth of the partial ink layer described herein can be in any direction, a more common growth would be in the direction of left to right as fully cursive words or phrases are formed in a direction from left to right.

Again, for most single character and full cursive input the first and second cells are square and the third and subsequent cells are rectangular; however, another shape and combination of cells can also be appropriate, particularly with special characters or under special circumstances. Also the movement of the touching device may be small enough to allow a character to be completely formed within the first cell, whereby the adaptive partial ink layer block contains only the first cell. The movement of the touching device may allow a character to be completely formed within the first cell and second cells, whereby the adaptive partial ink layer block contains only the first cell and second cells. Other touching device movements may allow a character to be completely formed in three or more cells, and in addition multiple character formation by the touching device may require a plurality of cells greater than two cells. Thus the number of cells (partial ink layer areas) that are required in the forming of characters on a computing device display are dependent upon the number of characters to be formed and movement of the touching device. The formation of partial ink layer areas described herein is only done the extent required to form an ink trail of the movement of the touching device used in inputting a character, or a plurality of characters, onto the touch screen of the computing device.

BRIEF DESCRIPTION OF THE DRAWINGS

This invention will be described with reference to the accompanying drawings, wherein.

DETAILED DESCRIPTION OF THE PREFERRED EMBODIMENT

Figure 1A:
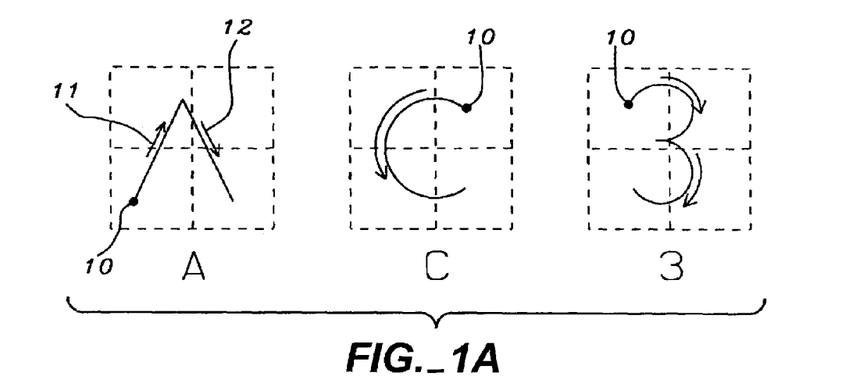
FIG. 1A shows character input using a touching device in contact with a touch screen of a computing device.

In FIG. 1A is shown an example of three Graffiti™ characters of PalmOS that are created by a touching device in contact with a touch screen of a PDA (personal data assistant) or similar computing device. The touching device can be a pen, stylus, finger or any other device with characteristics that are sufficient to form one or several characters when in contact with the touch screen. It should be noted, that the present invention is not limited to Graffiti™ characters or PalmOS operating systems and can be used with other handwriting methods and operating systems. A touching device-down point 10 (initial touching device contact) is shown at the beginning of the formation of each character as a black dot. The arrows 11 show the direction of the touching device movement. The dotted grid shows areas in the touch screen through which the touching device traverses.

Figure 1B:
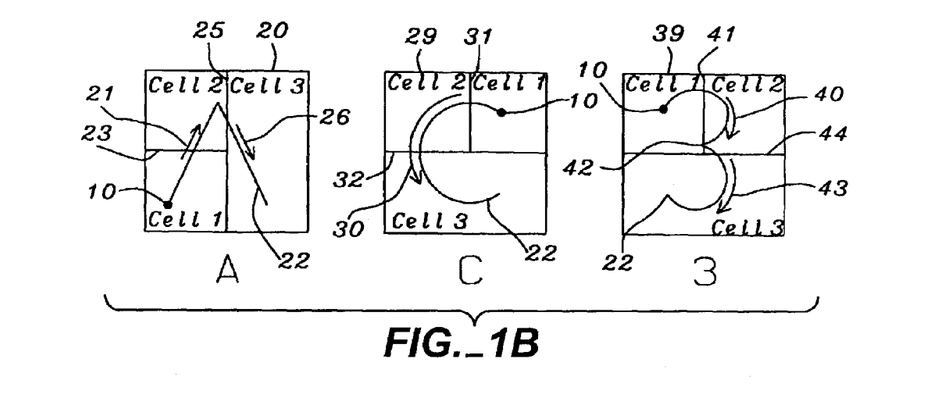
FIG. 1B shows an arrangement of adaptive cells in a partial ink layer of the present invention that can capture the input of character shown in FIG. 1A.

In FIG. 1B is shown the same Graffiti™ characters as shown in FIG. 1A using three cell areas, (cell 1, cell 2, and cell3) in an adaptive partial ink layer to draw each character. The adaptive ink layer uses a portion of the display screen of a computing device, such as a PDA (personal data assistant) to trace the movement of the touching device for inputting a character, word or phrase into the computing device. The adaptive ink layer is created in such a way as to form a cell only when the touching device crosses a cell boundary into an area where there is not a previously defined cell.

Rather than using four equal sized cell areas as shown in FIG. 1A, three areas are used, cell 1, cell2 and cell 3. Cell 1 and cell 2 are shown to be square in the examples shown in FIG. 1B, and cell 3 is rectangular. The three cells fit together to form a partial ink layer block 20 that is square. The Graffiti™ character "A" is formed by starting at the touching device-down point 10, which defines the location of cell 1. The touching device-down point 10 locates the center of cell 1, which has a size that is stored within the computing device. When the touching device is moved diagonally upward 21, an ink trail 22 is displayed in cell 1 as the touching device in contact with the touch screen begins to form the Graffiti™ character "A". When the upper boundary 23 of cell 1 is crossed, the computing device is signaled to form cell 2 above and continuously adjacent to cell 1. As the touching device moves within cell 2 a continuous ink trail is drawn. When the direction 26 of the touching device crosses a vertical boundary 25 of cell 2, cell 3 is created continuously adjacent to both cells 1 and 2. The ink trail 22 continues to be formed in cell 3, following the movement of the touching device until the touching device is lifted from the touch screen, whereupon the character A has been inputted into the computing device and the user has been able to see in real time that a proper character input is formed.

The character "C" shown in FIG. 1B is formed within a partial ink layer block 29 similar to the one used to form the character "A" with the exception of the arrangement of the three cells. The touching device-down point 10 is in the upper right quadrant of block 29, which locates cell 1 in the upper right corner of block 29. When the movement 30 of the touching device crosses the left vertical boundary of cell 1, the computing device creates cell 2 continuously adjacent to cell 1 and draws an ink trail continuously from the touching device-down point through cell 1 and into cell 2. When the movement 30 of the touching device crosses the bottom boundary of cell 2, cell 3 is created below and continuous with cells 1 and 2. The ink trail 22 following the movement of the touching device is drawn continuously from the touching device-down point 10 through cells 1 and 2 and into cell 3 until the touching device is removed from contact with the touch screen for a predetermined period of time T at which time the ink trail is erased.

The character "3" shown in FIG. 1B is formed within a partial ink layer block 39 where cell 1 defined by the touching device-down point 10 is in the upper left corner of block 39. When the movement 40 of the touching device from the touching device-down point 10 crosses the right vertical boundary 41 of cell 1, cell 2 is created continuously right adjacent to cell 1. The example for the input of the "3" character in FIG. 1B shows the ink trail 42 of the touching device movement crossing back into cell 1 from cell 2. Since touching device movement is contained within cells 1 and 2 that have been previously created, no further adaptive partial ink layer need to be created; however, when the movement of the touching device 43 crosses the lower boundary 44 of cell 2, cell 3 is created below and continuously adjacent to cells 1 and 2. The ink trail 22 is continued from the touching device-down point 10, through cells 1 and 2, back into cell 1, returning to cell 2 and then into cell 3, and the ink trail is erased upon the lifting of the touching device from the touch screen of the computing device for a predetermined time T.

Figure 1C:
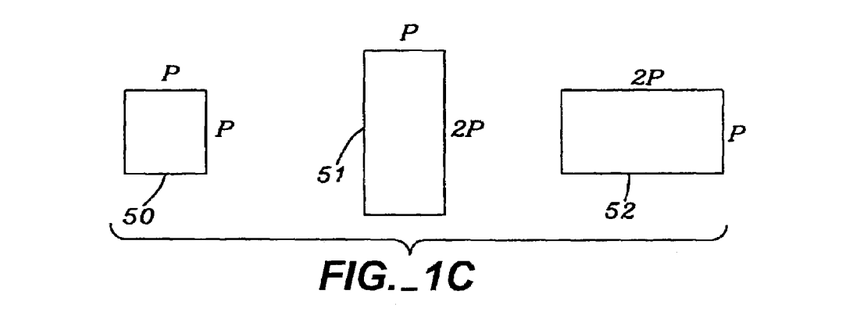
FIG. 1C shows an example of the dimensions and orientation of the cells of the present invention.

FIG. 1C shows the cell sizes and orientation for the example shown in FIG. 1B. Cells 1 and 2 are square 50 where each side of the square is P=40 pixels long. Cell 3 is a rectangle 51 and 52 with two orientations. The rectangle 51 has a vertical orientation and was used in FIG. 1B in the inputting of the character "A". The vertical height of the rectangle 51 is 2P=80 pixels and the width is P=40 pixels. The rectangle 52 has a horizontal orientation and was used in FIG. 1B in the inputting of the characters "C" and "3". The vertical height of the rectangle 52 is P=40 pixels and the width is 2P=80 pixels. Although the shape, sizes and orientation of the cells shown in FIGS. 1B and 1C provide a useful configuration for the adaptive partial ink layer, other shapes, sizes and orientation that can be created within the computing device can also be used.

Figure 1D:
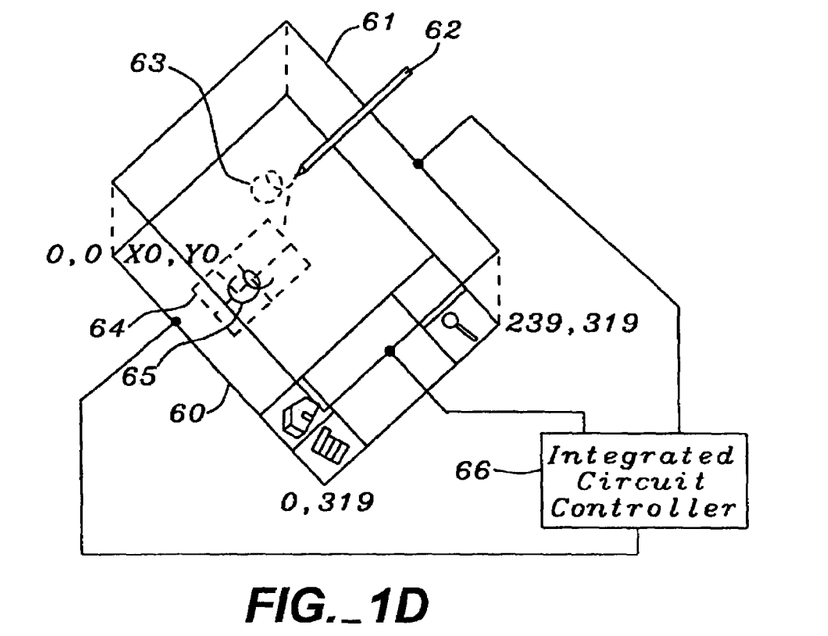
FIG. 1D shows an adaptive partial ink layer of the present invention on the display screen of a PDA.

An example of the formation of an ink trail is shown in FIG. 1D on a display screen 60 of a computing device, such as a PDA, having X=240 total pixels by Y=320 pixels. Overlaying the PDA screen is a touch screen 61 that is used to provide the location of a touching device 62 contact. The touching device traces a character or a group of characters 63, shown in FIG. 1D to be a cursive combination of the letters "C" and "L". On the display screen 60 is formed an adaptive partial ink layer 64, which displays an ink trail 65 showing where the touching device has been and allowing the user a visual image of the input to the touching device passed computing device. The adaptive partial ink layer 64 comprises 4 cells to allow the input of the cursive characters "CL" and is X=120 by Y=80 pixels in size, which has a significantly smaller memory requirement than a traditional ink layer covering a full display.

Continuing to refer to FIG. 1D, an integrated circuit controller 66 receives X and Y coordinate data about the location of the touching device, or touching device, 62 from the touch screen 61. The controller interprets what character or combination of cursive characters that are being formed and determines from the location and direction of movement of the touching device, the shape and location of the partial ink layer 64. The controller 66 supplies data to the display screen 60 for drawing the ink trail 65. As the touching device crosses an imaginary boundary of a cell within the adaptive partial ink layer 64, the controller determines whether the block needs to be expanded as a result of the touching device moving outside of the adaptive partial ink layer 64. The controller monitors the touching device and detects when the touching device is no longer in contact with the touch screen. If after a period of time T the touching device is no longer in contact with the touch screen, the controlled determines that the formation of the character, or the cursive combination of characters, is completed and turns off the ink trail 65. The of a period of time T, is to allow for the creation of multi-stroke characters.

Figure 2A:
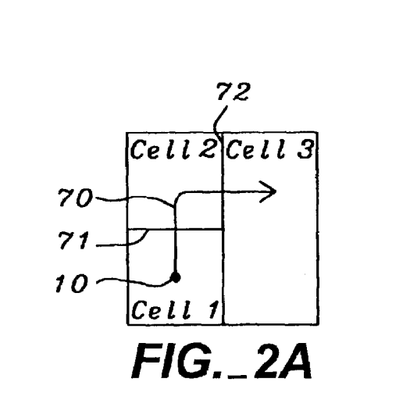
FIG. 2A through 2H show different combinations of the adaptive partial ink layer cells of the present invention depending upon the direction of the movement of the touching device.
Figure 2B:
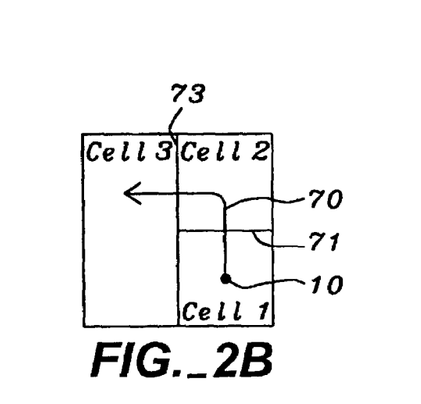

In FIG. 2A through 2H are shown different configurations of the first three cells of the adaptive ink layer of the present invention. The cells (also known herein as partial ink layer areas) are grouped depending first on the movement of the touching device from cell 1 to cell 2 and then from cell 2 to cell 3. In FIG. 2A a touching device-down point 10 locates cell 1. Movement 70 of the touching device vertically and crossing the upper boundary 71 of cell 1 signals the computing device to create cell 2 vertically adjacent to cell 1. As the touching device movement 70 crosses the vertical boundary 72 of cell 2, cell 3 is created with a vertical orientation and right adjacent to both cells 1 and 2. In FIG. 1B the touching device movement crosses the left vertical boundary of cell 2, which causes the computing device to create cell 3 with a vertical orientation and left adjacent to cells 1 and 2.

Figure 2C:
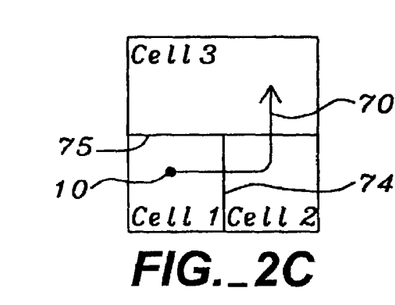
Figure 2D:
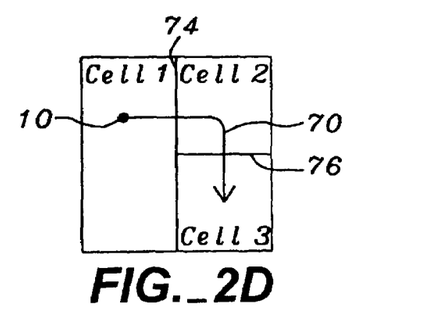

In FIG. 2C after the touching device-down point 10, the direction of movement 70 of the touching device crosses the right vertical boundary 74 of cell 1, which signals the touching device based computing device to form cell 2 to the right of cell 1. When the touching device crosses the upper boundary 75 of cell 2, cell 3 is formed with a horizontal orientation and adjacent to the upper boundaries of both cells 1 and 2. In FIG. 2D after cell 2 is formed upon the touching device crossing the right vertical boundary 74, the touching device crosses the lower boundary 76 of cell 2, which signals the computing device to create cell 3 with a horizontal orientation and adjacent to the lower boundaries of cells 1 and 2.

Figure 2E:
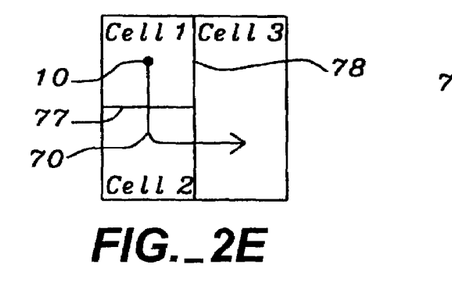
Figure 2F:
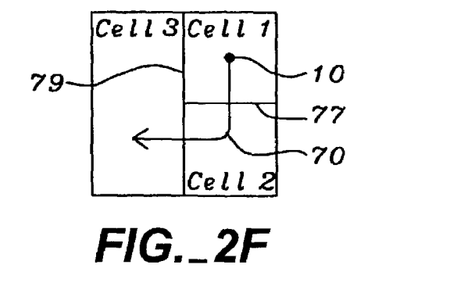

In FIG. 2E the touching device moves vertically downward 70 from the touching device-down point 10 and crosses the lower boundary 77 of cell 1. When the lower boundary 77 of cell 1 is crossed, cell 2 is formed below cell 1 and adjacent to cell 1. When the touching device movement 70 crosses the right boundary 78 of cell 2, cell 3 is formed with a vertical orientation and adjacent to the right boundaries of cells 1 and 2. In FIG. 2F the touching device moves vertically downward from the touching device-down point 10 crossing the lower boundary of cell 1 which creates cell 2 below cell 1 in order to allow a partial ink layer area to follow the movement of the touching device. When crosses the left vertical boundary 79 of cell 2, cell 3 is created with a vertical orientation and adjacent to the left boundaries of cells 1 and 2.

Figures 2G, 2H:
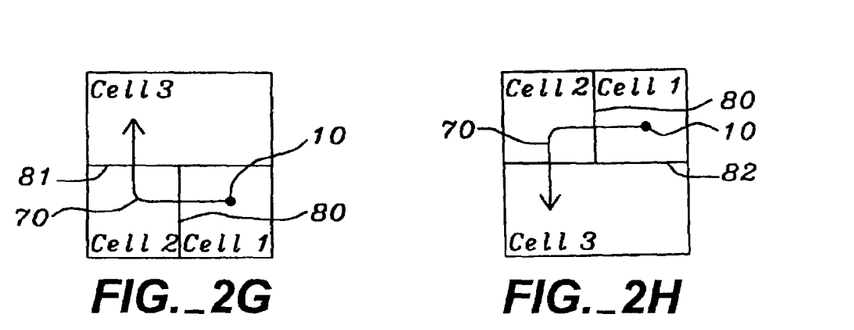

In FIG. 2G the touching device movement 70 is from the touching device-down point 10 to the left and across the left vertical boundary 80 of cell 1. When the left vertical boundary 80 of cell 1 is crossed, cell 2 is created left adjacent to cell 1. When the touching device crosses the upper boundary 81 of cell 2, cell 3 is created with a horizontal orientation and adjacent to the upper boundaries of cells 1 and 2. In FIG. 2H the touching device movement 70 crosses the lower boundary 82 of cell 2, which creates cell 3 with a horizontal orientation adjacent to the lower boundaries of cells 1 and 2.

Figure 3A:
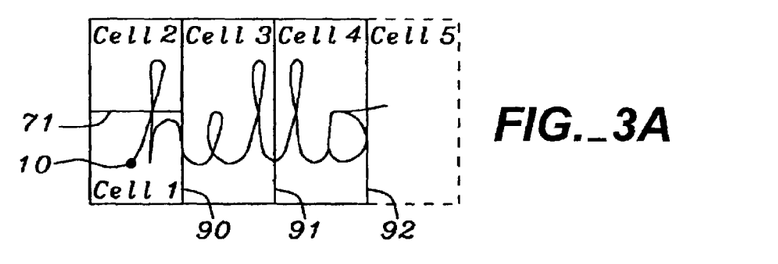
FIGS. 3A and 3B show a combination of adaptive partial ink layer cells used in entering a fully cursive word or phrase in the present invention.
Figure 3B:
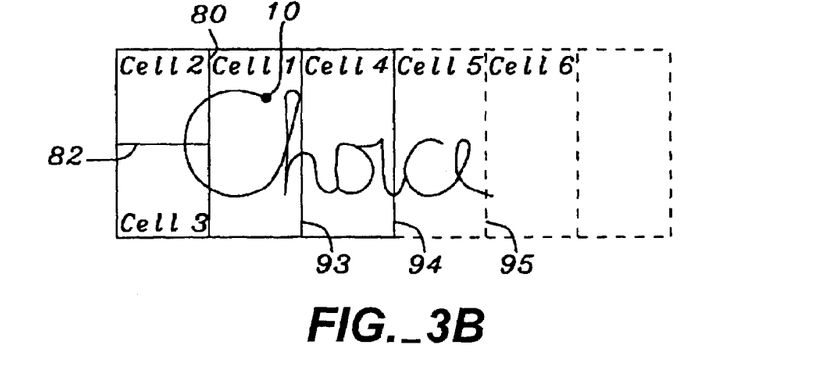

Shown in FIGS. 3A and 3B are cursive input of the words "hello" and "Choice" as they might be traced on an adaptive partial ink layer. In FIG. 3A the cursive word "hello" is formed by the touching device moving from the touching device-down point 10 in cell 1 vertically across the upper boundary 71 of cell 1, which forms cell 2 above cell 1. The touching device then makes a tight loop in cell 2 and then returns to cell 1 where the right vertical boundary 90 of cell 1 is crossed, which causes the computing device to form cell 3 right adjacent to cells 1 and 2. As the right boundary of cell 3 is crossed, cell 4 is created by the computing device to provide additional space to form the ink trail of the touching device. Cell 4 is vertically oriented and right adjacent to cell 3. Although cell 4 can be any size, the size of cell 4 in this example is the same as cell 3 previously described. As the input of the cursive word "hello" continues a cell 5 is created if the right vertical boundary of cell 4 is crossed by the touching device before the touching device is lifted from contact with the touch screen. If the cursive input continues additional cells N are created as the right vertical boundary of cell N−1 is crossed by the movement of the touching device in contact with the touch screen.

In FIG. 3B the word "Choice" is traced out by the touching device in contact with the touch screen. The movement of the touching device is left from the touching device-down point 10 and across the left vertical boundary 80 of cell 1. This creates cell 2 to the left of cell 1. When the touching device crossed the lower boundary 82 of cell 2, cell 3 is created horizontally oriented and adjacent to the lower boundaries of cells 1 and 2. Cell 4 is created when the touching device crosses the right vertical boundary 93 of cell 3. Cell is vertically oriented and adjacent to the right vertical boundaries of both cells 1 and 3. As the right boundary of cell 4 is crossed cell 5 is created. If the cursive input continues additional cells N are created as the right vertical boundary of cell N−1 is crossed by the movement of the touching device in contact with the touch screen.

In both FIGS. 3A and 3B the general movement of the touching device is from left to right as the cursive words are created for input into the computing system. This is not the only direction in which the flow of an input can be accommodated. The general flow can be in any direction and the additional cells N>3 can be added above, below or to the left of the initial three cell block. If the additional cells N>3 are added to the left side of the initial three cell block, the cell orientation will be the same as shown in FIGS. 3A and 3B. However, if the additional cells are added above or below the initial three cell block, the additional cells N>3 will have a horizontal orientation and will be horizontally adjacent to the initial three cell block and to any subsequent additional cell which was previously created. Also, the examples of the cells shown herein are square and rectangular. Any shaped cell that can be accommodated by the computing devices can be used to create an adaptive partial ink layer.

Figure 4A:
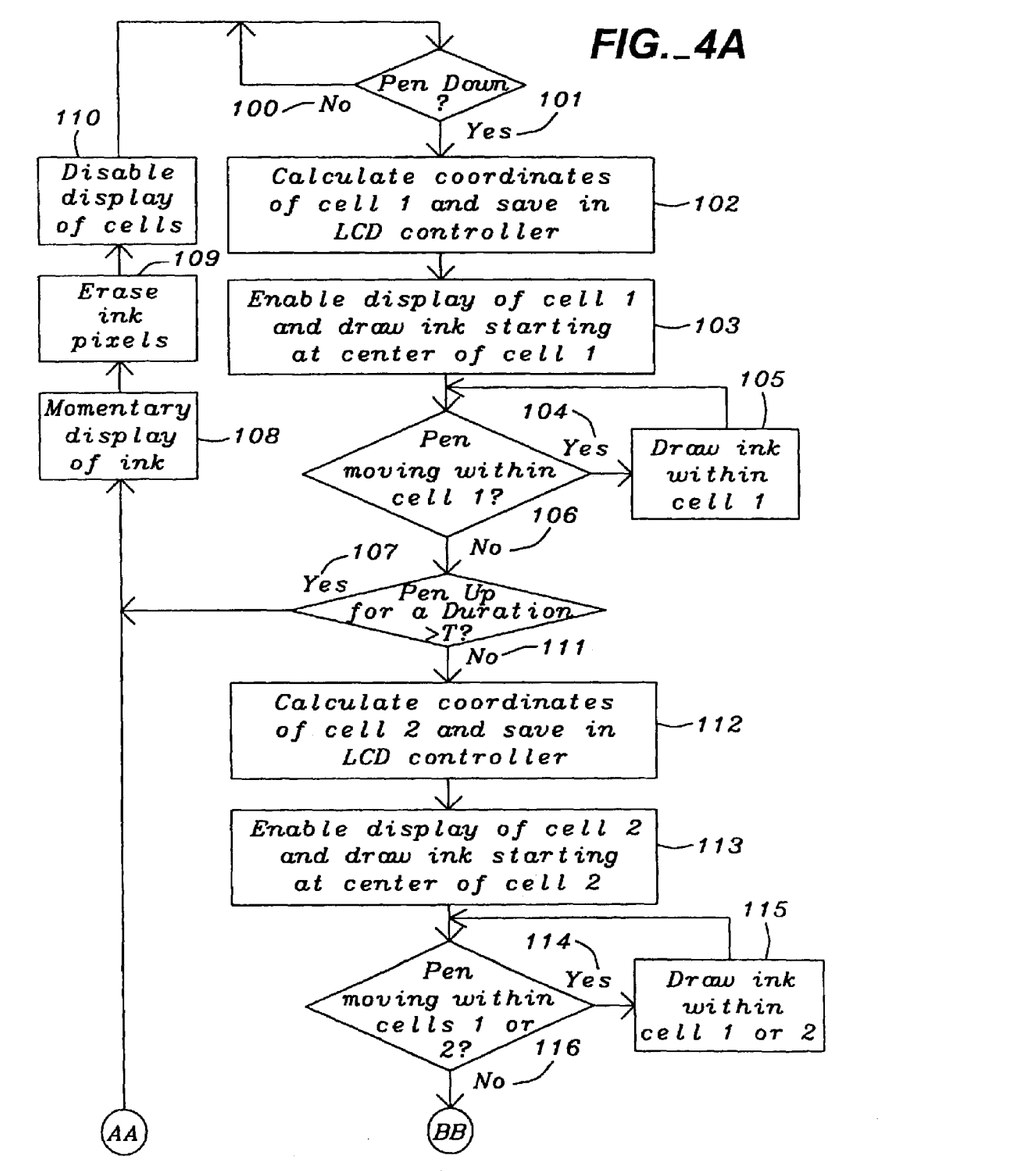
FIGS. 4A, 4B and 4C show a method of the present invention for entering characters and drawing an ink trail using an adaptive partial ink layer.
Figure 4B:
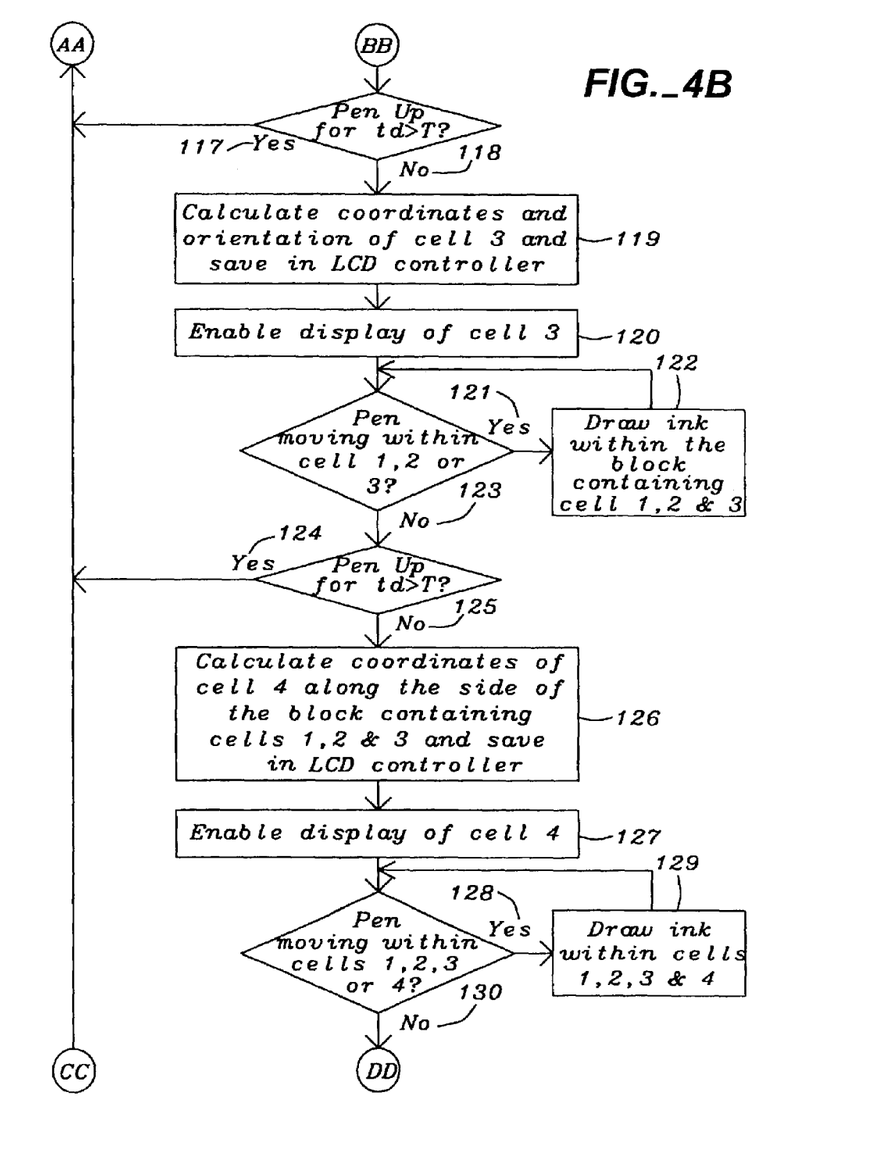
Figure 4C:
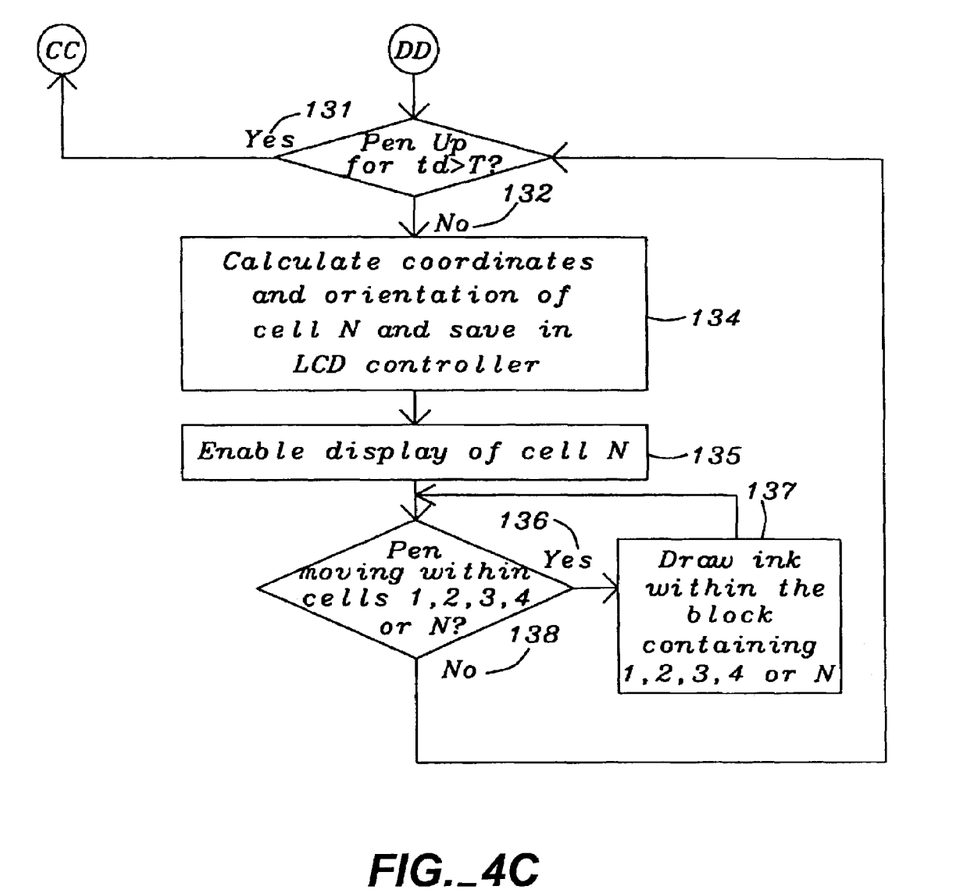

In FIGS. 4A, 4B and 4C is shown a flow diagram for creating an adaptive partial ink layer and the drawing of ink within the adaptive partial ink layer herein known as a "ink trail". A pen is used in FIGS. 4A, 4B and 4C to represent a touching device; however, any touching device, such as a stylus, finger or any other similar instrument, can be used if the touching device characteristics are adequate to form a character or plurality of characters in the allowed space when in contact with the touch screen. If the pen or touching device has not been detected to be down in contact with the touch screen 100, the computing device waits for the pen-down contact. When the pen or touching device is detected to contact the touch screen 101, coordinates are calculated for cell 1 of the adaptive partial ink layer and saved in the LCD (liquid crystal display) controller 102. Then cell 1 is displayed and ink is drawn in cell 1 as the pen or touching device in contact with the touch screen is moved 103. Cell 1 is centered at the pen-down point, and the start of the ink trail is from the center of cell 1. As the pen or touching device continues to move within cell 1 (104), the ink trail is continued to be drawn within cell 1 (105). When the pen or touching device is no longer detected to be moving within cell 1 (106), and if the pen or touching device is no longer in contact with the touch screen (pen up for a duration greater than a time T) 107, then the ink trail is momentarily displayed 108, the ink pixels are erased 109, the cells of the adaptive partial ink trail are disabled 110 and the system returns to waiting for the next pen down 101. The waiting for a time T to elapse before concluding the pen or touching device is up 107, allows multi-stroke characters to be formed before the computing apparatus interprets that a single stroke character was formed.

Continuing to refer to FIGS. 4A, 4B and 4C, if the pen or touching device is no longer moving within cell 1 (106) but the pen or touching device is down in contact with the touch screen 111, then the coordinates for cell 2 are calculated and saved in the LCD controller 112. The display of cell 2 is enabled and the ink trail of the pen or touching device is continued to be drawn 113. If the pen or touching device continues to move within cells 1 or 2 (114), then the ink trail of the pen or touching device is continued to be drawn within cells 1 or 2 (115). If the pen or touching device is no longer moving within cells 1 or 2 (116) and if the pen or touching device is no longer in contact with the touch screen 117, then the ink trail is momentarily displayed 108, the ink pixels are erased 109, the cells of the adaptive partial ink trail are disabled 110 and the system returns to waiting for the next pen-down 101. If the pen or touching device is no longer moving within cells 1 or 2 (116) and if the pen or touching device is still in contact with the touch screen 118, then the coordinates are calculated for cell 3 and saved in the LCD controller 119. Cell 3 is enabled on the display screen 120, and if the pen or touching device moves within the block of cells containing cells 1, 2 or 3 (121) the ink trail of the pen or touching device is continuously drawn within the block containing cells 1, 2 or 3 (122). If the pen or touching device is no longer moving within cells 1, 2 or 3 (123) and if the pen or touching device is no longer in contact with the touch screen 124, then the ink trail is momentarily displayed 108, the ink pixels are erased 109, the cells of the adaptive partial ink trail are disabled 110 and the system returns to waiting for the next pen-down 101.

Continuing to refer to FIGS. 4A, 4B and 4C, If the pen or touching device is no longer moving within cells 1, 2 or 3 (123) and the pen or touching device is still in contact with the touch screen 125, then the coordinates of cell 4 are calculated such as to position cell 4 adjacent to the boundary crossed by the pen or touching device along the side of the block containing cells 1,2, and 3 (126) and then enabling the display of cell 4 (127). Reviewing FIGS. 3A and 3B demonstrates two situations where cell 4 is positioned differently with respect to the block containing cells 1, 2 and 3. In both of these examples the cursive input of the pen or touching device is from left to right. Cell 4 and the subsequent cells can be positioned along any of the 4 boundaries of the block and thus allowing an input of the pen or touching device to be in any direction that can be accommodated by the interpreter within the computing device.

Continuing to refer to FIGS. 4A, 4B and 4C, If the pen or touching device is moving within cells 1, 2, 3 or 4 (128), then the ink trail of the pen or touching device is drawn in the cells 1, 2, 3 and 4 following the movement of the pen or touching device 129. If the pen or touching device is not moving within cells 1, 2, 3 or 4 (130) and if the pen or touching device is up 131, then the ink trail is momentarily displayed 108, the ink pixels are erased 109, the cells of the adaptive partial ink trail are disabled 110 and the system returns to waiting for the next pen-down 101. If the pen or touching device is not up 132, the orientation and the coordinates of cell N are calculated 134. Since cell N is used in a cursive word or phrase, cell N will have the same orientation as cell 4. Cell N is then enabled 135, and if the pen or touching device is moving within cells 1, 2, 3,4 or N (136), the ink trail will be drawn within cells 1, 2, 3, 4 or N (137) following the movement of the pen or touching device in contact with the touch screen. If the pen or touching device is not moving within cell 1, 2, 3, 4 or N (138) and the pen or touching device is not up (132), a cell N=N+1 will be created 134 and 135. If the pen or touching device is up 131, the adaptive partial ink layer will be closed as previously described (steps 108, 109, and 110) and the computing device will wait for the next pen-down 101.

Figure 5:
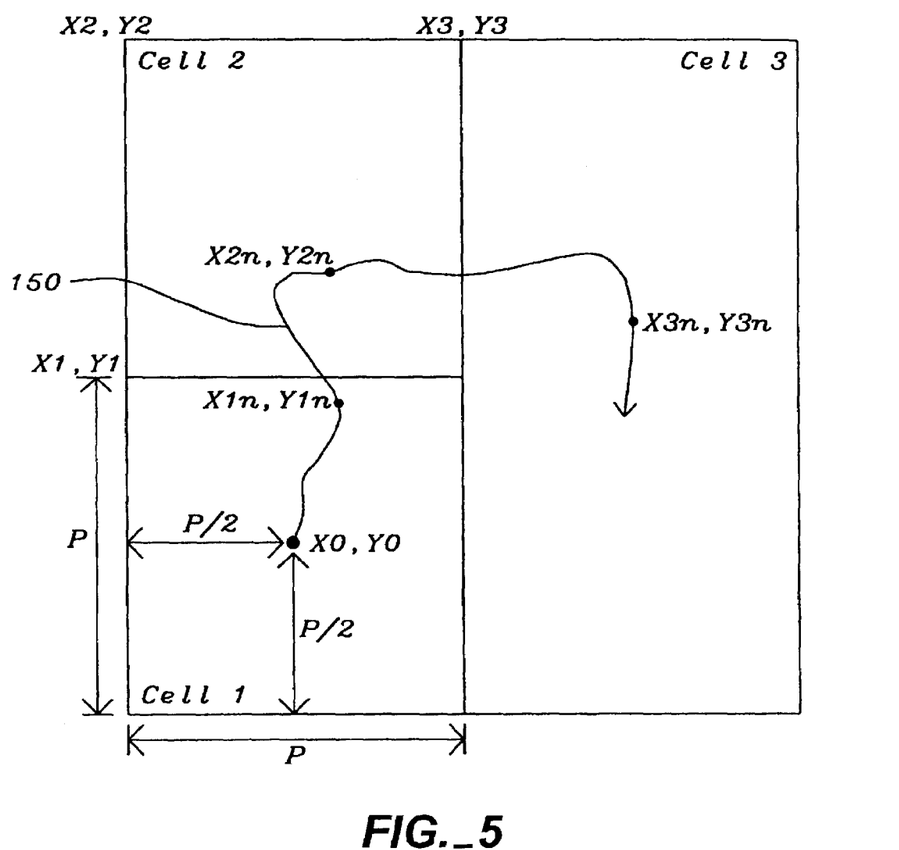
FIG. 5 shows a coordinate system of the present invention used to locate ink cells.

FIG. 5 shows an example of the determination of the location of the ink cells that make up the ink trail of the present invention. The example shown in FIG. 5 uses a three-cell block oriented the same as the block in FIG. 2A. The location of the ink cells in the other configurations shown in FIG. 2B through 2H are determined in a similar way, but may have different equations for specifying coordinates. The top left corner of the LCD display is assumed to be at global coordinates "0, 0". The initial pen-down point is assumed to be located at global coordinated X0, Y0 and is at the center of cell 1. Cell 1 and cell 2 are square with P pixels on a side and cell 3 is rectangular having the dimensions of P×2P pixels.

Continuing to refer to FIG. 5, after the initial pen-down at X0, Y0, the pen or touching device moves within cell 1 and the ink cells of an ink trail 150 can be determined by $X1n=X-X1=X-X0+P/2$ and $Y1n=Y-Y1=Y-Y0+P/2$, where $X1=X0-P/2$ and $Y1=Y0-P/2$ are the local origin of cell 1. If $Y<Y1$, then the pen or touching device is located in cell 2, and the ink trail is continued in cell 2. The local origin for cell 2 is $X2=X0-P/2$ and $Y2=Y0-3P/2$. The ink cells within cell 2 are determined by $X2n=X-X2=X-X0+P/2$ and $Y2n=Y-Y2=Y-Y0+3P/2$. If $X>X2+P$, then the pen or touching device is located in cell 3, and the ink trail is continued to be drawn in cell 3. The local origin for cell 3 is $X3=X0+P/2$ and $Y3=Y0-3P/2$. The ink cells within cell 3 are determined by $X3n=X-X3=X-X0-P/2$ and $Y3n=Y-Y3=Y-Y0+3c/2$.

While the invention has been particularly shown and described with reference to preferred embodiments thereof, it will be understood by those skilled in the art that various changes in form and details may be made without departing from the spirit and scope of the invention.

What is claimed is:

1. A method of creating an adaptive partial ink layer for a computing device, comprising:
  a) contacting a touch screen overlaying a display screen of said computing device with a touching device for character entry into said computing device,
  b) forming a first partial ink layer area centered around a point of contact of said touching device,
  c) forming a second partial ink layer area adjacent and continuous with said first partial ink layer area when said touching device crosses a first boundary of said first and second partial ink layer areas,
  d) forming a third partial ink layer area adjacent and continuous with said first and said second partial ink layer areas when said touching device crosses a second boundary of said first or second partial ink layer area that is orthogonal to said first boundary, thereby combining said first, second and third partial ink layer areas into a partial ink layer block,
  e) moving said touching device to create a character as input to said computing device and drawing an ink trail of said character in said block,
  f) erasing said ink trail when said touching device is removed for a predetermined time from contact with said touch screen.

2. The method of claim 1, wherein said touching device is any device capable of forming one or a plurality of coherent characters when in contact with said touch screen.

3. The method of claim 2, wherein said touching device is a stylus, pen or finger.

4. The method of claim 1, wherein moving said touching device in contact with said touch screen is done in a manner that forms said character completely within said first partial ink layer area.

5. The method of claim 1, wherein moving said touching device in contact with said touch screen is done in a manner that forms said character completely within said first and second partial ink layer areas.

6. The method of claim 1, wherein moving said touching device in contact with said touch screen is done in a manner that forms said character completely within said first, second and third partial ink layer areas.

7. The method of claim 1, wherein said partial ink layer block is formed by said first partial ink layer area.

8. the method of claim 1, wherein said partial ink layer block is formed by said first partial ink layer area and said second partial ink layer area.

9. The method of claim 1, wherein said first and said second partial ink layer areas are each square in shape and having P pixels on a side.

10. The method of claim 1, wherein said third partial ink layer area is twice the size of said first partial ink layer area and rectangular in shape with sides that are P by 2P pixels.

11. The method of claim 1, wherein said block is square in shape and is 2P pixels by 2P pixels in size.

12. The method of claim 11, further comprising:
   a) forming said block to be 2P pixels by 2P pixels,
   b) extending said block by an additional partial ink layer area N whereby said extended block is 2P×(2+N) P pixels,
   c) moving said touching device across said additional partial ink layer area N to input additional characters and drawing said ink trail to show where said touching device had been.

13. The method of claim 12, wherein extending said block forms said additional partial ink layer area N adjacent and continuous with an N−1 partial ink layer area when said touching device crosses a third boundary located on said N−1 partial ink layer area.

14. The method of claim 13, wherein formation of said additional partial ink layer area N is created when a movement of said touching device is generally in a direction from said N−1 partial ink layer area to said additional partial ink layer area N and said third boundary of said N−1 partial ink layer is crossed.

15. The method of claim 14, wherein said N and N−1 partial ink layer areas have a vertical orientation and said movement of said touching device is from left to right forming an adaptive partial ink layer area that is 2P×(2+N) P.

16. The method of claim 14, wherein said N−1 partial ink layer area has a horizontal orientation and said N partial ink layer area has a vertical orientation forming an adaptive partial ink layer that is 2P×(2+N) P.

17. The method of claim 1, further comprising:
   a) forming said second partial ink layer area vertically adjacent and continuous with said first partial ink layer area on said display screen,
   b) forming said third partial ink layer area adjacent and continuous with said first and said second partial ink layer areas.

18. The method of claim 17, wherein forming said third partial ink layer area creates said third partial ink layer area located left of said first and second partial ink layer areas.

19. The method of claim 17, wherein forming said third partial ink layer area creates said third partial ink layer area located right of said first and second partial ink layer areas.

20. The method of claim 17, further comprising forming a fourth partial ink layer area whereby said fourth partial ink layer area is located adjacent to said boundary of said third partial ink layer area which is opposite to said boundary of said third partial ink layer area with said first and second partial ink layer areas.

21. The method of claim 17, wherein said second partial ink layer area is located above or below said first partial ink layer area.

22. The method of claim 1, further comprising:
   a) forming said second partial ink layer area horizontally adjacent and continuous with said first partial ink layer area on said display screen,
   b) forming said third partial ink layer area adjacent and continuous with said first and said second partial ink layer areas.

23. The method of claim 22, wherein forming said third partial ink layer area creates said third partial ink layer area with a horizontal orientation and located above said first and second partial ink layer areas.

24. The method of claim 22, wherein forming said third partial ink layer area creates said third partial ink layer area with a horizontal orientation and located below said first and second partial ink layer areas.

25. The method of claim 22, further comprising forming a fourth partial ink layer area whereby said fourth partial ink layer area is located adjacent to a vertical edge formed by said first second and third partial ink layer areas.

26. The method of claim 22, wherein said second partial ink layer area is located to the left or to the right of said first partial ink layer area.

27. An adaptive partial ink layer for a computing device, comprising:
   a) a first partial ink layer area,
   b) a second partial ink layer area,
   c) a third partial ink layer area,
   d) said first partial ink layer area formed when a touching device contacts a touch screen of a computing device for character entry into said computing device,
   e) said second partial ink layer area formed adjacent and continuous with a first boundary of said first partial ink layer area when said first boundary of said first partial ink layer area is crossed by said touching device,
   f) said third partial ink layer area formed adjacent and continuous with a second boundary formed by said first and second partial ink layer areas when said second boundary is crossed by said touching device.

28. The adaptive partial ink layer of claim 27, wherein said touching device is any device capable of forming one or a plurality of coherent characters when in contact with said touch screen.

29. The adaptive partial ink layer of claim 28, wherein said touching device is a stylus, pen or finger.

30. The adaptive partial ink layer of claim 27, wherein said touching device is moved in a manner to form said character completely within said first partial ink layer area.

31. The adaptive partial ink layer of claim 27, wherein said touching device is moved in a manner to form said character completely within said first and second partial ink layer areas.

32. The adaptive partial ink layer of claim 27, wherein said touching device is moved in a manner to form said character completely within said first, second and third partial ink layer areas.

33. The adaptive partial ink layer of claim 27, wherein said first partial ink layer area is centered at a point of initial contact of said touching device.

34. The adaptive partial ink layer of claim 33, wherein said first partial ink layer area is square having a dimension of P pixels by P pixels.

35. The adaptive partial ink layer of claim 27, wherein said first and second partial ink layer areas are a same shape and size.

36. The adaptive partial ink layer of claim 27, wherein said third partial ink layer area is rectangular in shape and has an area twice that of said first partial ink layer area.

37. The adaptive partial ink layer of claim 36, wherein said third partial ink layer area is P pixels by 2P pixels.

38. The adaptive partial ink layer of claim 27, wherein said second partial ink layer area is vertically adjacent and continuous with said first partial ink layer area and whereby both said first and second partial ink layer areas are adjacent and continuous with said third partial ink layer area which is oriented vertically and which shares said second boundary with said first and second partial ink layer areas.

39. The adaptive partial ink layer of claim 38, wherein said third partial ink layer area is located left of said first and second ink layer areas.

40. The adaptive partial ink layer of claim 38, wherein said third partial ink layer area is located right of said first and second ink layer areas.

41. The adaptive partial ink layer of claim 38, wherein said second partial ink layer area is located above or below said first ink layer area.

42. The adaptive partial ink layer of claim 27, wherein said second partial ink layer area is horizontally adjacent and continuous with said first partial ink layer area and whereby both said first and second partial ink layer areas are adjacent and continuous with said third partial ink layer area which is oriented horizontally and which shares said second boundary with said first and second partial ink layer areas.

43. The adaptive partial ink layer of claim 42, wherein said third partial ink layer area is located above said first and second ink layer areas.

44. The adaptive partial ink layer of claim 42, wherein said third partial ink layer area is located below said first and second ink layer areas.

45. The adaptive partial ink layer of claim 42, wherein said second partial ink layer area is located left or right of said first ink layer area.

46. The adaptive partial ink layer of claim 27, further comprising an N partial ink layer area adjacent to an N−1 partial ink layer area whereby said N partial ink layer area is formed when said touching device crosses a third boundary formed by said N−1 partial inlayer area whereby third boundary is formed between said N−1 and N partial ink layer areas.

47. The adaptive partial ink layer of claim 46, wherein said N partial ink layer area is formed as said touching device in contact with said touch screen moves from left to right and crosses said third boundary.

48. An adaptive area for a partial ink layer, comprising:
  a) a means for forming a first area of a partial ink layer upon contact of a pen to a touch screen on a pen based computing device,
  b) a means for forming a second area adjacent and continuous with said first area as said pen in contact with said touch screen crosses a first boundary formed by said first area,
  c) a means for forming a third area adjacent and continuous with both said first and said second areas as said pen in contact with said touch screen crosses a second boundary of said first and second areas,
  d) a means for producing an ink trail tracing where said pen had been,
  e) a means for erasing said ink trail upon lifting of said pen from contact with said touch screen.

49. The adaptive area of claim 48, wherein said means for forming said second area places said second area above or below said first area depending upon a location of said first boundary crossed by said pen.

50. The adaptive area of claim 49, wherein said means for forming said third area places said third area left or right of said first and second areas depending upon a location of said second boundary crossed by said pen.

51. The adaptive area of claim 48, wherein said means for forming said second area places said second area left or right of said first area depending upon a location of said first boundary crossed by said pen.

52. The adaptive area of claim 51, wherein said means for forming said third area places said third area above or below said first and second areas depending upon a location of said second boundary crossed by said pen.

53. The adaptive area of claim 48, further comprising a means for forming an N area in said partial ink layer adjacent and continuous with an N−1 area, whereby said N area is formed in such a way as to provide a continuous ink trail of said pen when said pen in contact with said touch screen crosses an N−1 boundary formed by said N−1 area.

54. A controller for creating an ink trail on a pen based computing device, comprising:
  a) a means for detecting a touching device in contact with a touch screen,
  b) a means for interpreting an input from said touch screen being touched by said touching device,
  c) a means for forming an adaptive partial ink layer on a display screen,
  d) a means for forming an ink trail within said partial ink layer to follow movement of said touching device.

55. The controller of claim 54, wherein said means for detecting said touching device in contact with said touch screen further comprises:
  a) a means for detecting the coordinates of said touching device,
  b) a means for determining a direction of movement of said touching device,
  c) a means for determining the need to expand said adaptive partial ink layer in the direction of movement of said touching device,
  d) a means for determining when to erase said ink trail after said touching device is removed from contact with said touch screen after a sufficient delay to allow multi-stroke characters.

56. The controller of claim 54, wherein said means for interpreting said input from said touch screen further comprises a means for determining which character or cursive combination of characters are being written onto said touch screen by said touching device.

57. The controller of claim 54, wherein said means for forming an adaptive partial ink layer creates and controls said partial ink layer within said display screen that adapts to the input from said touch screen resulting from contact with said touching device.

58. The controller of claim 54, wherein said means for forming said ink trail creates an instant replica of a character or cursive combination of characters being written on said touch screen by said touching device.

* * * * *